United States Patent
Farooq et al.

(10) Patent No.: US 10,618,485 B2
(45) Date of Patent: Apr. 14, 2020

(54) VEHICLE ENERGY ABSORBER

(71) Applicant: Ford Global Technologies, LLC, Dearborn, MI (US)

(72) Inventors: S.M. Iskander Farooq, Novi, MI (US); Mohammad Omar Faruque, Ann Arbor, MI (US); Nirmal Muralidharan, Birmingham, MI (US); Yali Li, Saline, MI (US); Dean M. Jaradi, Macomb, MI (US); Srinivasan Sundararajan, Ann Arbor, MI (US); Ching-Hung Chuang, Northville, MI (US); Ninad Trifale, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/948,175

(22) Filed: Apr. 9, 2018

(65) Prior Publication Data

US 2019/0308576 A1    Oct. 10, 2019

(51) Int. Cl.
*B60R 19/18* (2006.01)
*B60R 19/03* (2006.01)

(52) U.S. Cl.
CPC .............. *B60R 19/18* (2013.01); *B60R 19/03* (2013.01); *B60R 2019/186* (2013.01)

(58) Field of Classification Search
CPC ............................... B60R 19/18; B60R 19/03
USPC ........................................................ 293/133
See application file for complete search history.

(56) References Cited

U.S. PATENT DOCUMENTS

| | | | | |
|---|---|---|---|---|
| 3,995,901 A | * | 12/1976 | Filbert, Jr. | .............. B60R 19/18 293/136 |
| 5,033,593 A | * | 7/1991 | Kazuhito | ............... B60J 5/0443 188/377 |
| 5,340,178 A | * | 8/1994 | Stewart | .................... B60R 19/18 293/122 |
| 6,290,272 B1 | * | 9/2001 | Braun | ..................... B60R 19/18 293/102 |
| 7,278,667 B2 | | 10/2007 | Mohapatra et al. | |
| 7,959,197 B2 | | 6/2011 | Agrahari et al. | |
| 8,876,179 B2 | | 11/2014 | Nagwanshi et al. | |
| 9,238,443 B2 | | 1/2016 | Bobba et al. | |
| 9,731,669 B2 | | 8/2017 | Nagwanshi et al. | |

(Continued)

FOREIGN PATENT DOCUMENTS

DE    102011107995 A1    1/2013

OTHER PUBLICATIONS

Emmanuel Glasson, et. al., "Car Front End Module Structure Development Regarding Pedestrian Protection and other Mechanical Constraints", SAE 2001 World Congress, SAE International Paper No. 2001-01-0761, Published Mar. 5, 2001, retrieved from the Internet URL http://papers.sae.org/2001-01-0761 (2 pages).

(Continued)

*Primary Examiner* — Jason S Morrow
(74) *Attorney, Agent, or Firm* — Frank A. MacKenzie; Bejin Bieneman PLC

(57) ABSTRACT

A bumper assembly includes a bumper beam and a fin supported by the bumper beam. The fin has a proximate end proximate to the bumper beam and a distal end distal to the bumper beam and an axis extending from the proximate end to the distal end. The fin has a sinuous shape in a cross section normal to the axis.

13 Claims, 5 Drawing Sheets

(56) References Cited

U.S. PATENT DOCUMENTS

| | | | |
|---|---|---|---|
| 10,046,723 B1* | 8/2018 | Faruque .................. | B60R 19/18 |
| 2010/0109353 A1* | 5/2010 | Allen ...................... | B60R 19/18 |
| | | | 293/120 |
| 2011/0204663 A1* | 8/2011 | Baccouche ............. | B60R 19/18 |
| | | | 293/102 |
| 2013/0001964 A1* | 1/2013 | Freundl .................. | B60R 19/18 |
| | | | 293/133 |
| 2017/0036624 A1* | 2/2017 | Yabu ....................... | B60R 19/03 |
| 2017/0144618 A1 | 5/2017 | Martini et al. | |
| 2017/0203708 A1* | 7/2017 | Jaradi ..................... | B60R 19/18 |
| 2017/0334381 A1* | 11/2017 | Cheng ................... | B60R 19/023 |
| 2017/0355332 A1* | 12/2017 | Pingston ................ | B60R 19/44 |
| 2017/0369013 A1* | 12/2017 | Muralidharan ......... | B60R 19/40 |
| 2018/0244222 A1* | 8/2018 | Nusier .................... | B60R 19/18 |

OTHER PUBLICATIONS

Baracos, et. al., "Ford "S" Frame", 1969 International Automotive Engineering Congress and Exposition, SAE International Paper No. 690004, Published Feb. 1, 1969, retrieved from the Internet URL http://papers.sae.org/690004 (1 page).

* cited by examiner

VEHICLE ENERGY ABSORBER

BACKGROUND

Vehicle bumpers may have a stiffness determined by the material and structure of the bumper. However, the desired stiffness of the bumper may be different depending on vehicle speed. For example, at a low vehicle speed, a higher stiffness may be desired to prevent damage to the bumper, while at a high vehicle speed, a lower stiffness may be desired to absorb energy during a pedestrian or vehicle impact.

Several vehicle research organizations release test protocols and standards for vehicles directed to specific outcomes. For example, the Research Council for Automobile Repairs (RCAR) releases impact test protocols and standards for vehicles. One example RCAR impact test protocol is directed toward low speed damageability (LSD), i.e., damage to vehicle component at 15 kilometers per hour (kph). In another example, the National Highway Traffic Safety Administration (NHTSA) releases the Federal Motor Vehicle Safety Standards (FMVSS) Part 581, which describes impact test protocols for LSD of vehicle bumper systems. However, as described above, the stiffness of the bumper system for LSD may differ from the stiffness desired for pedestrian protection. For example, the European New Car Assessment Programme (EURO NCAP) protocols for upper leg impact at 40 kph and lower leg impact at 40 kph may be benefited by a lower stiffness for the bumper in comparison to the stiffness desired for FMVSS protocols for LSD. In other words, requirements for LSD and pedestrian protection may create competing design principles. There remains an opportunity to design a vehicle bumper that accounts for low speed damageability and pedestrian impact.

DETAILED DESCRIPTION

Figure 1:
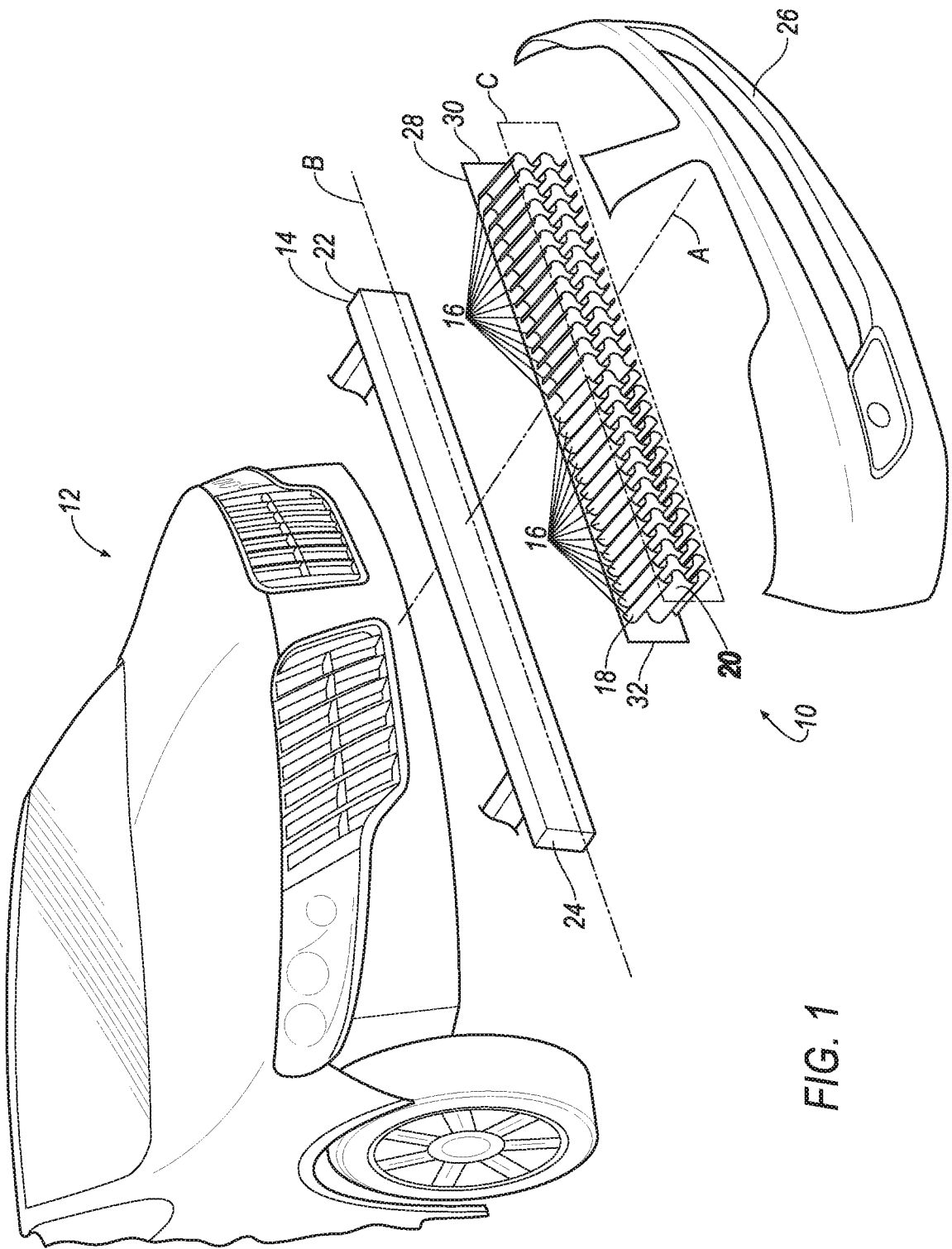
FIG. 1 is an exploded view of a vehicle with a bumper assembly.

A bumper assembly includes a bumper beam and a fin supported by the bumper beam, the fin having a proximate end proximate to the bumper beam and a distal end distal to the bumper beam, and an axis extending from the proximate end to the distal end, wherein the fin has a sinuous shape in a cross section normal to the axis.

The bumper assembly may further include a plurality of fins, the plurality of fins including the fin, each of the plurality of fins being supported by the bumper beam and each having a proximate end proximate to the bumper beam and a distal end distal to the bumper beam, and each having an axis extending from the proximate end to the distal end, wherein each fin has a sinuous cross section normal to the respective axis.

The fins may be spaced along a longitudinal axis of the bumper beam.

The bumper assembly may further include a plate supported by the bumper beam, wherein the fins may be supported by the plate.

The plate may extend in a cross-vehicle direction from a first end to a second end and may include a center between the first and second ends, the plate defining a first side between the first end and the center and a second side between the second end and the center, and wherein the fins include a first fin attached to the first side of the plate and a second fin attached to the second side of the plate.

The first fin may have a different orientation than the second fin.

The orientation of the first fin may mirror the orientation of the second fin.

The distal ends may each present a flat surface, the flat surfaces may define a plane, and each fin may have a sinuous cross section in the plane.

The fins may be evenly spaced along the bumper beam.

The fins may be spaced along the bumper beam in a cross-vehicle direction.

The distal end may have a distal flat surface.

The bumper assembly may further include a fascia, wherein the fin may be disposed between the bumper beam and the fascia.

The bumper assembly may further include a plate supported by the bumper beam, wherein the fin may be attached to the plate.

The sinuous shape may include a first curve and a second curve.

The fin may have a center line, the first curve may define a first opening, and the second curve may define a second opening, the first opening opposing the second opening about the center line.

The fin may have a material thickness increasing from the proximate end to the distal end.

The proximate end may extend to the distal end in a vehicle-forward direction.

The cross section may be substantially constant from the proximate end to the distal end.

The fin may be constructed of a plastic.

With reference to the Figures, wherein like numerals indicate like parts throughout the several views, a bumper assembly 10 in a vehicle 12 includes a bumper beam 14 and a fin 16 supported by the bumper beam 14. The fin 16 has a proximate end 18 proximate to the bumper beam 14 and a distal end 20 distal to the bumper beam 14. The fin 16 has an axis A extending from the proximate end 18 to the distal end 20. The fin 16 has a sinuous shape in a cross section normal to the axis A.

The fin 16 may absorb energy from an object during an impact, deforming toward the bumper beam 14. By absorbing energy from the object, the fin 16 may satisfy low speed damageability (LSD) test protocols. Furthermore, the sinuous shape provides specific deformation characteristics for the fin 16 to absorb energy from the object. For example, the sinuous shape may provide axial deformation characteristics when absorbing energy from the object, which may resist deformation at low speeds and may allow deformation at high speeds. Thus, the fin 16 with the sinuous shape may have a high stiffness during a low speed impact and a low stiffness during a high-speed impact.

Figure 4B:
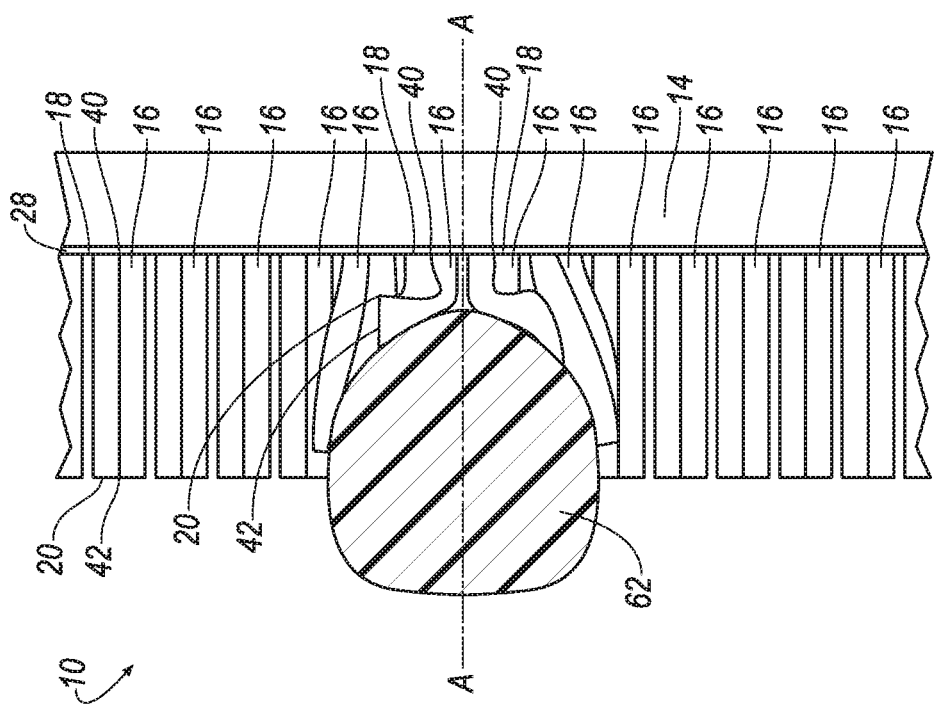
FIGS. 4A-4B illustrate the bumper assembly impacting an object.
Figure 4A:
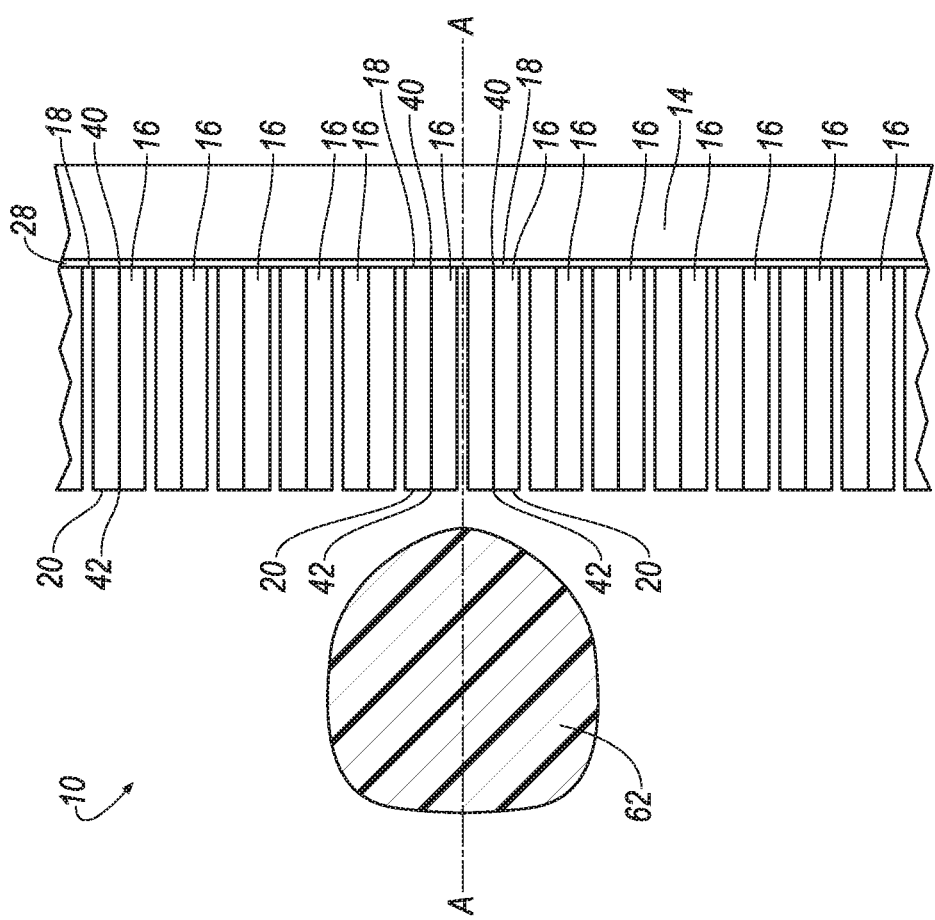
Figure 5B:
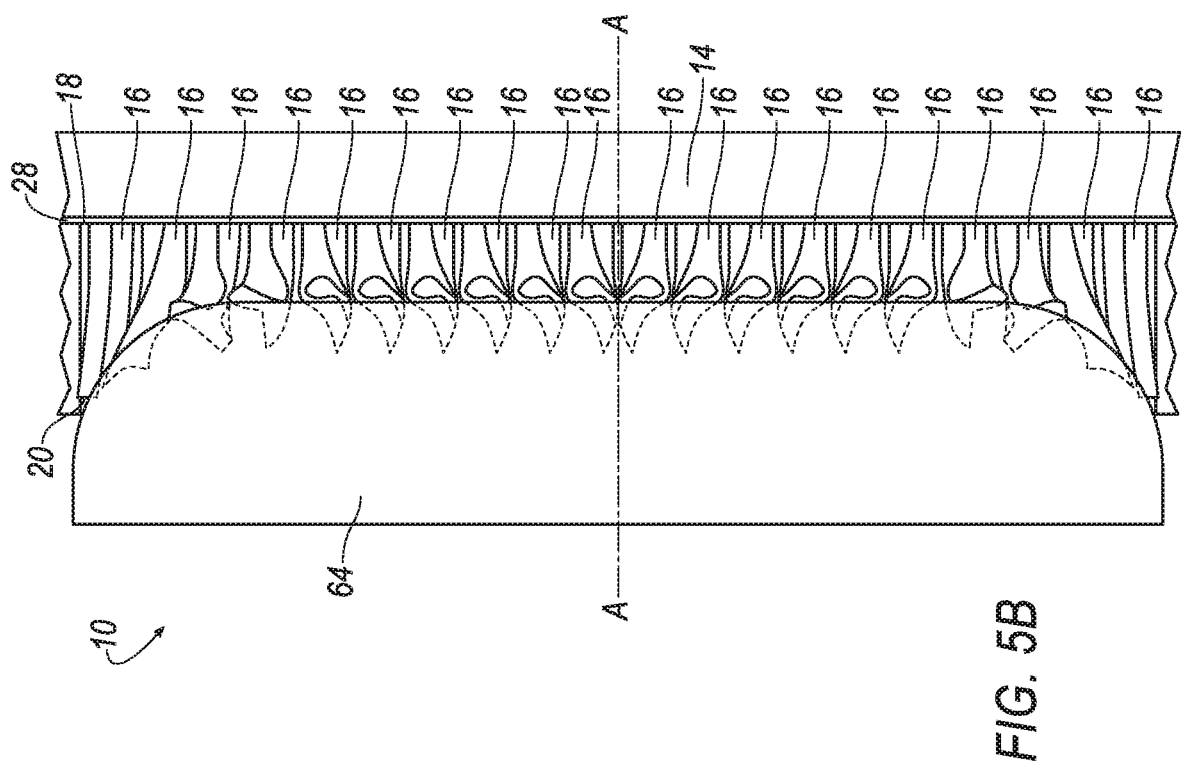
FIGS. 5A-5B illustrate the bumper assembly impacting another object.

The bumper assembly 10 may include a plurality of fins 16, as shown in FIGS. 1-2 and 4A-5B. The fins 16 may be supported by the bumper beam 14, as shown in FIGS. 1-2 and 4A-5B. The fins 16 may absorb energy from the impact. The fins 16 may be disposed between the bumper beam 14 and the fascia 26, as shown in FIG. 1. During the impact, an object may contact the fins 16, as shown in FIGS. 4B and 5B, deforming the fins 16.

As shown in FIG. 1, the vehicle 12 includes the bumper assembly 10. The bumper assembly 10 may absorb energy during the impact. The bumper assembly 10 includes the bumper beam 14 and the fins 16. The fins 16 are supported by the bumper beam 14, as shown in FIGS. 1-2 and 4A-5B. The fins 16 may be constructed of, e.g., a plastic, a metal, a composite, etc.

The bumper beam 14 may extend from a first end 22 to a second end 24. The bumper beam 14 may define a longitudinal axis B between the first end 22 and the second end 24 of the bumper beam 14. The longitudinal axis B may extend in a cross-vehicle direction, i.e., in a direction perpendicular to forward motion of the vehicle 12.

The bumper assembly 14 may include the fascia 26, as shown in FIG. 1. The fascia 26 may be a portion of an exterior of the vehicle 12. The fascia 26 may be supported by the bumper beam 14. The fascia 26 may be spaced from the bumper beam 14. The fins 16 may be disposed between the bumper beam 14 and the fascia 26. The fins 16 may abut the fascia 26. Alternatively, the fins 16 may be spaced from the fascia 26. The fascia 26 may be attached to a body (not numbered) and/or to the bumper beam 14.

The bumper assembly 12 may include a plate 28, as shown in FIGS. 1-2 and 4A-5B. The plate 28 may be supported by the bumper beam 14. The plate 28 may be attached to the bumper beam 14 with a fastener, e.g., a bolt, a screw, a press-fit dowel, a weld, etc. The plate 28 may support the fin 16. The plate 28 may extend along the longitudinal axis B of the bumper beam from a first end 30 to a second end 32. The plate 28 may be constructed of, e.g., a plastic, a metal, a composite, etc. The plate 28 may be constructed of the same material as the fin 16.

Figure 2:
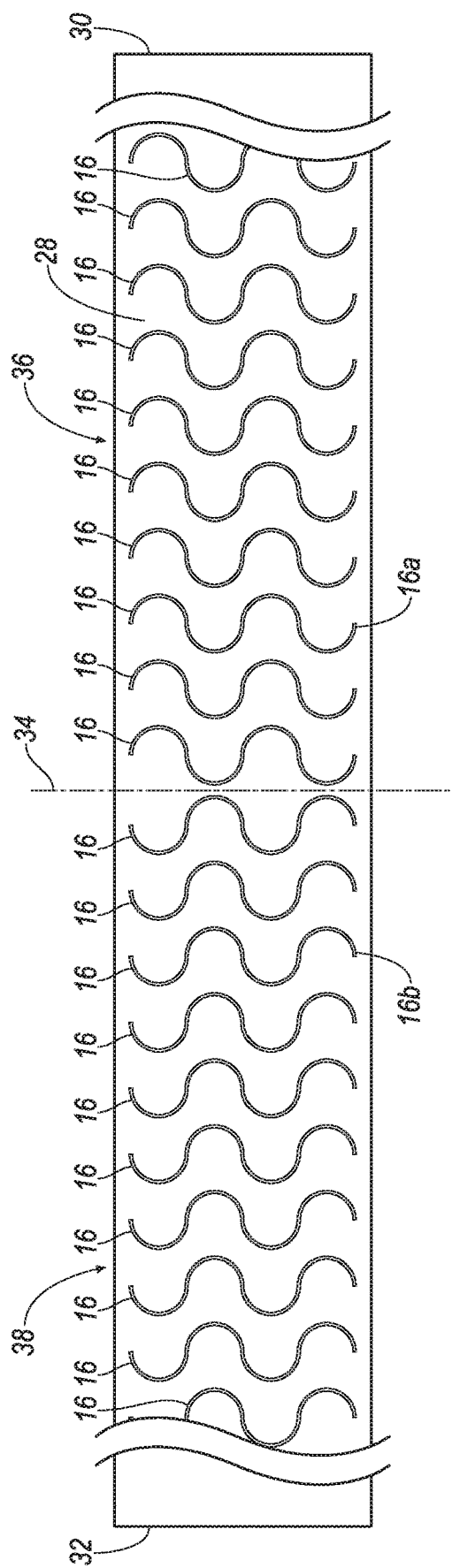
FIG. 2 is a front view of a plurality of fins.

The plate 28 has a center 34, as shown in FIG. 2. The center 34 of the plate 28 may divide the plate 28 into a first side 36 and a second side 38. The center 34 may be disposed between the first end 30 and the second end 32 of the plate. The center 34 may be disposed substantially halfway between the first end 30 and the second end 32 of the plate.

The fins 16 each have a proximate end 18 and a distal end 20, as shown in FIGS. 1 and 4A-5B. Each fin 16 defines the axis A from the proximate end 18 to the distal end 20. In FIGS. 1 and 4A-5B, the axis A is shown for one of the fins 16, and the other fins 16 may extend along respective axes parallel to the axis A. Alternatively, the fins 16 may not be parallel to each other, i.e., the respective axes may not be parallel to the axis A. Each respective axis extends from the respective proximate end 18 to the respective distal end 20. The proximate end 18 is proximate to the bumper beam 14, and the distal end 20 is distal to the bumper beam 14. The proximate end 16 may be attached to the plate 28. Alternatively, the proximate end 16 may be integral with the plate 28, i.e., formed as a unitary construction. The distal end 20 may receive the object during the impact, as shown in FIGS. 4B and 5B. Thus, the distal end 20 may deform relative to the proximate end 18 during the impact.

Each fin 16 has a respective proximate end 18 and a respective distal end 20. Each fin 16 may extend from the proximate end 18 to the distal end 20 along the axis A. Each proximate end 18 of each fin 16 may present a proximal flat surface 40. The proximal flat surfaces 40 may contact the plate 28. For example, the proximal flat surface 40 may be attached to the plate 28, e.g., with an adhesive, a braze, a weld, etc. Each distal end 20 of each fin may present a distal flat surface 42. The distal flat surfaces 42 may receive the object during the impact. The distal flat surfaces 42 may define a plane C, as shown in FIGS. 1 and 3.

Figure 3:
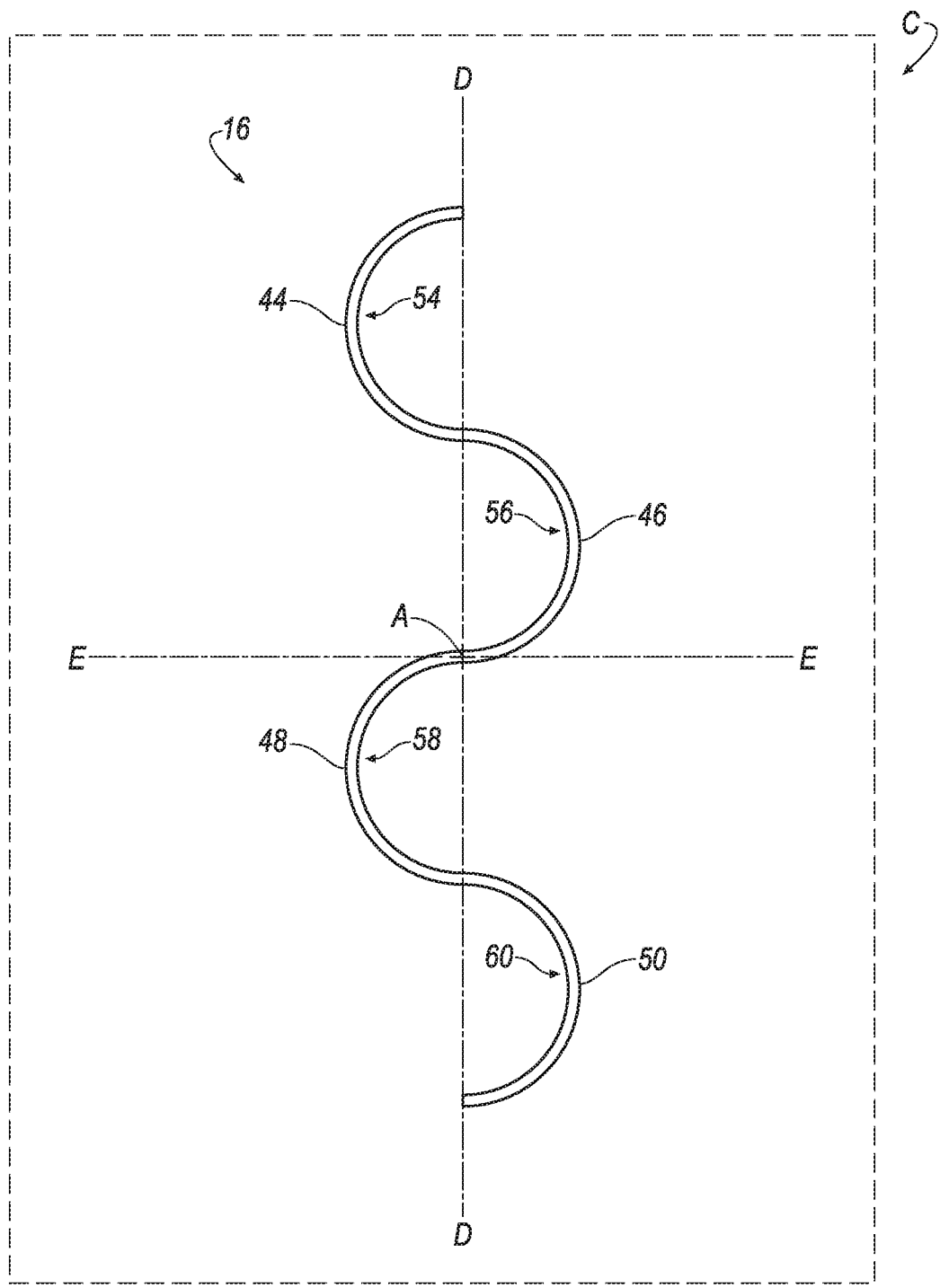
FIG. 3 is a front view of one of the plurality of fins.

Each fin 16 has a cross section, as shown in FIG. 3. The cross section has a sinuous shape. As used herein, the term "sinuous" means "having at least two curves." The cross section has a sinuous shape normal to the axis A. The cross section is sinuous in the plane C defined by the distal flat surfaces. That is, the axis A may be normal to the plane C. The sinuous shape may be substantially S-shaped. The sinuous cross section may provide deformation characteristics for the fin 16 that are similar to a closed cylindrical tube. Furthermore, the sinuous cross section may provide the tube-like deformation characteristics to a shape that is not a closed circle, e.g., the sinuous shape extending along the rectangular bumper beam 14. Thus, the fin 16 can provide specific deformation characteristics for various shapes of bumper assemblies 10.

The sinuous shape includes a plurality of curves. For example, the sinuous shape may include a first curve 44, a second curve 46, a third curve 48, and a fourth curve 50, as shown in FIG. 3. The first curve 44 defines a first opening 54, the second curve 46 defines a second opening 56, the third curve 48 defines a third opening 58, and the fourth curve 50 defines a fourth opening 60. Each of the curves 44, 46, 48, 50 may be substantially C-shaped.

The sinuous shape may define a first center line D and a second center line E in the plane C. The sinuous shape may be symmetric about the second center line E. The first and third openings 54, 58 may oppose the second and fourth openings 56, 60 about the first center line D. The first and second openings 54, 56 may oppose the third and fourth openings 58, 60 about the second center line E. The sinuous shape may define a mirror image about the second center line E.

The fins 16 may be spaced from each other along the bumper beam 14. As shown in FIGS. 1-2 and 4A-5B, the fins 16 may be spaced from each other along the longitudinal axis B of the bumper beam 14, i.e., in the cross-vehicle direction. The fins 16 may be spaced evenly along the bumper beam 14. Alternatively, the spacing between the fins 16 may vary. The fins 16 may be spaced to provide specific deformation characteristics during the vehicle impact. A first fin 16a may be attached to the first side 36 of the plate 28, and a second fin 16b may be attached to a second side 38 of the plate 28, as shown in FIG. 2. Each fin 16 may have a fin orientation, i.e., a position of the fin 16 on the plate 28 about one or more of the axis A, the first center line D, and the second center line E. The fin orientation of the first fin 16a may be different than the fin orientation of the second fin 16b, as shown in FIG. 2, e.g., the fin orientation of the first fin 16a may mirror the fin orientation of the second fin 16b. Alternatively, the first fin 16a may have a fin orientation transverse to a fin orientation of the second fin 16b.

Each fin 16 has a material thickness. The material thickness may be a width of the fin 16 along the longitudinal axis B. The material thickness may increase from the proximate end 18 to the distal end 20. Alternatively, the material thickness may be substantially constant from the proximate end 18 to the distal end 20. The material thickness may be chosen to provide specific deformation characteristics of the fins 16.

The bumper assembly 10 may absorb energy during a high-speed impact test. The high-speed impact test may be a high-speed pedestrian impact test, e.g., a European New Car Assessment Program (EURO NCAP) Pedestrian Testing Protocol Version 8.4 (November 2017), that simulates an impact between a pedestrian's leg and the vehicle 12. The test uses a legform 62, which is a test device including a plurality of sensors (not shown) designed to simulate a human leg. In the high-speed pedestrian impact test, the legform 62 is attached to a launcher (not shown), e.g., an air, spring, or hydraulic gun, in front of the vehicle 12. The launcher propels the legform 62 toward the vehicle 12 and into the bumper assembly 10. The launcher is positioned to propel the legform 62 at a specific angle relative to the axis A, e.g., 0 degrees to simulate a front impact. The launcher propels the legform 62 to the bumper assembly 10 such that the legform 62 moves at 10.9-11.3 meters per second (39.2-40.7 kilometers per hour) upon contacting the bumper assembly 10. A computer (not shown) collects data from the sensors in the legform 62 on the forces and moments applied to different parts of the legform 62, e.g., parts representing an upper femur, a lower tibia, a knee, a position above the knee (e.g. 50 mm), and a position below the knee (e.g., 50 mm). Furthermore, images of the bumper assembly 10 are collected to determine deformation of the bumper assembly 10, e.g., deformed fins 16.

FIGS. 4A-4B show the legform 62 impacting the vehicle 12 in a high-speed pedestrian impact test. FIG. 4A shows the legform 62 prior to impacting the bumper assembly 10, and FIG. 4B shows the legform 62 upon impacting the bumper assembly 10. Upon impact, the legform 62 engages one or more fins 16, deforming the distal ends 20 of the fins 16 toward the plate 28. Because the fins 16 have the sinuous cross section, as described above, the fins 16 may deform along the axis A, absorbing more energy from the legform 62 and reducing acceleration on the legform 62 during the impact. Furthermore, in the impact shown in FIGS. 4A-4B, only a few of the plurality of fins 16 receive the legform 62, providing a controlled deceleration and controlled movement of the legform 62 as the fins 16 deform and absorb energy from the legform 62. Thus, the impulse from the impact is spread over a longer time during the impact, reducing impact energy transmitted to the legform 62.

The bumper assembly 10 may absorb energy during a low speed vehicle impact test. The low speed vehicle impact test may be an RCAR low speed damageability test or an Insurance Institute for Highway Safety (IIHS) bumper test. The test uses an impact barrier 64 that simulates an end of another vehicle 12. The impact barrier 64 may be a rigid object with an energy absorber designed to simulate a bumper on another vehicle 12. The vehicle 12 moves toward the impact barrier 64 at a specified speed, e.g., 15-16 kilometers per hour, such that the bumper assembly 10 impacts the impact barrier 64. Upon impacting the impact barrier 64, the vehicle 12 decelerates. Images of the bumper assembly 10 are collected to measure the deformation of the bumper assembly 10, e.g., the deformation of the fins 16.

Figure 5A:
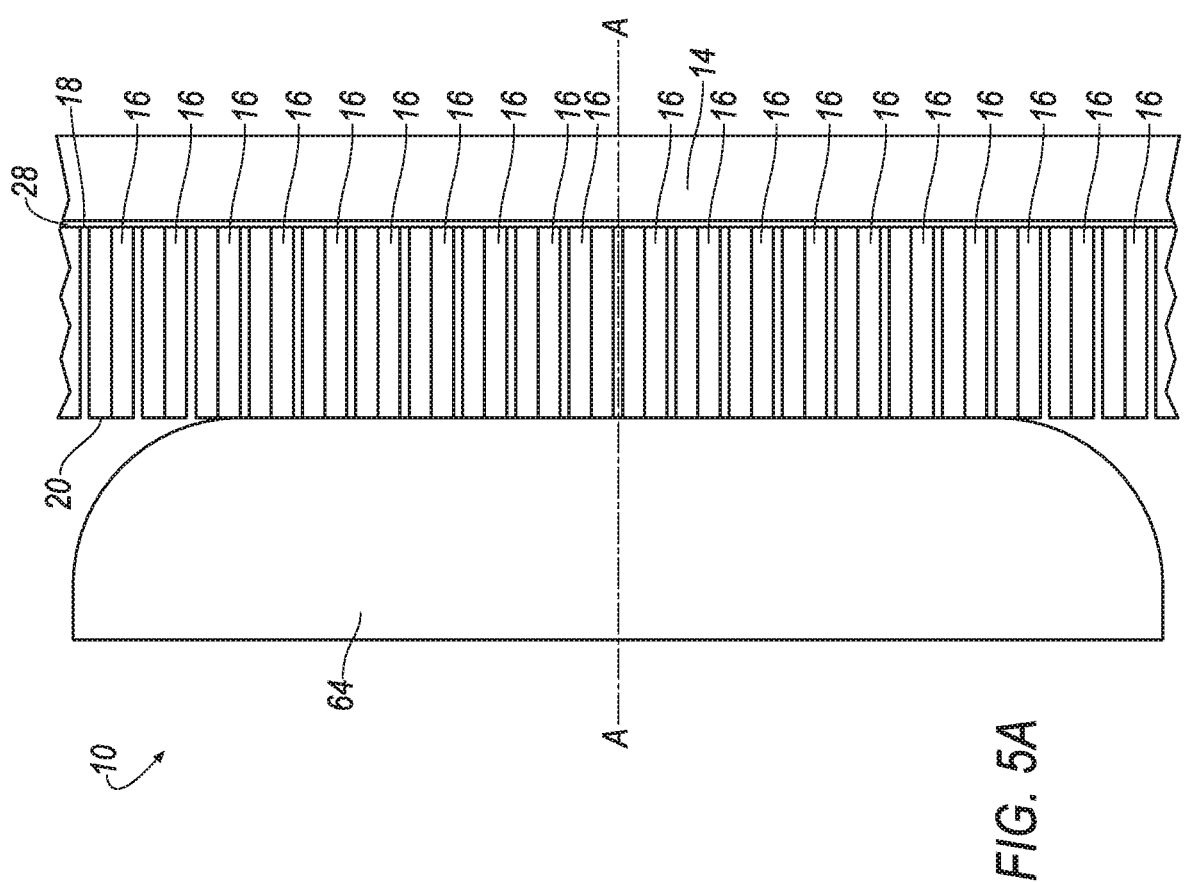

FIGS. 5A-5B show the impact barrier 64 impacting the vehicle 12 in a low speed damageability test. FIG. 5A shows the impact barrier 64 prior to impacting the bumper assembly 10, and FIG. 5B shows the impact barrier 64 upon impacting the bumper assembly 10. The impact barrier 64 may engage the distal ends 20 of the fins 16. During the impact, most or all of the plurality of fins 16 may engage the impact barrier 64, distributing the impact load and reducing the force on each individual fin 16. The fins 16 absorb energy from the impact barrier 64 while reducing the deformation in each individual fin 16. Thus, the fins 16 reduce intrusion of any specific part of the impact barrier 64 to the vehicle 12, improving low speed damageability. The impulse from the impact is spread over a longer time during the impact, reducing impact energy transmitted to the impact barrier 64.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A bumper assembly, comprising:
   a bumper beam;
   a plate supported by the bumper beam extending in a cross-vehicle direction from a first end to a second end and including a center between the first and second ends; and
   a plurality of fins supported by the plate, the fins each having a proximate end proximate to the plate and a distal end distal to the plate, and an axis extending from the proximate end to the distal end;
   wherein the fins each have a sinuous shape in a cross section normal to the axis;
   wherein the plate defines a first side between the first end and the center and a second side between the second end and the center, and wherein all of the fins disposed on the first side of the plate have a same first orientation and all of the fins disposed on the second side of the plate have a same second orientation mirroring the first orientation.

2. The bumper assembly of claim 1, wherein the fins are spaced along a longitudinal axis of the bumper beam.

3. The bumper assembly of claim 1, wherein the distal ends each present a flat surface, the flat surfaces defining a plane, and each fin has a sinuous cross section in the plane.

4. The bumper assembly of claim 1, wherein the fins are evenly spaced along the bumper beam.

5. The bumper assembly of claim 1, wherein the fins are spaced along the bumper beam in the cross-vehicle direction.

6. The bumper assembly of claim 1, wherein the distal end has a distal flat surface.

7. The bumper assembly of claim 1, further comprising a fascia, wherein each fin is disposed between the bumper beam and the fascia.

8. The bumper assembly of claim 1, wherein the sinuous shape includes a first curve and a second curve.

9. The bumper assembly of claim 8, wherein each fin has a center line, the first curve defines a first opening, and the second curve defines a second opening, the first opening opposing the second opening about the center line.

10. The bumper assembly of claim 1, wherein each fin has a material thickness increasing from the proximate end to the distal end.

11. The bumper assembly of claim 1, wherein the proximate end extends to the distal end in a vehicle-forward direction.

12. The bumper assembly of claim 1, wherein the cross section is substantially constant from the proximate end to the distal end.

13. The bumper assembly of claim 1, wherein each fin is constructed of a plastic.

* * * * *